United States Patent
Ng et al.

(10) Patent No.: US 9,883,353 B2
(45) Date of Patent: Jan. 30, 2018

(54) METHOD TO TRANSMIT REAL-TIME IN-VEHICLE INFORMATION TO AN INTERNET SERVICE

(71) Applicants: VOLKSWAGEN AG, Wolfsburg (DE); AUDI AG, Ingolstadt (DE)

(72) Inventors: Brian Ng, San Francisco, CA (US); Lars Scholz, Belmont, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 173 days.

(21) Appl. No.: 13/836,904

(22) Filed: Mar. 15, 2013

(65) Prior Publication Data
US 2014/0280552 A1    Sep. 18, 2014

(51) Int. Cl.
| | | |
|---|---|---|
| *H04W 4/04* | (2009.01) | |
| *H04W 4/18* | (2009.01) | |
| *H04L 12/58* | (2006.01) | |
| *H04L 29/08* | (2006.01) | |

(52) U.S. Cl.
CPC ............ *H04W 4/046* (2013.01); *H04L 51/32* (2013.01); *H04L 67/12* (2013.01); *H04W 4/185* (2013.01)

(58) Field of Classification Search
CPC ......... H04L 67/10; H04L 51/32; H04L 67/12; H04W 4/046; H04W 4/185
USPC ....................................................... 709/204
See application file for complete search history.

(56) References Cited

U.S. PATENT DOCUMENTS

| | | | | |
|---|---|---|---|---|
| 8,270,933 B2* | 9/2012 | Riemer | ............. | H04M 1/72577 455/345 |
| 8,655,965 B2* | 2/2014 | McWithey | ............ | H04W 4/027 709/206 |
| 8,718,621 B2* | 5/2014 | Ross | .................... | H04M 7/0024 455/414.1 |
| 8,761,821 B2* | 6/2014 | Tibbitts | ................. | H04W 48/04 455/297 |
| 8,779,947 B2* | 7/2014 | Tengler | ................... | H04W 4/00 307/10.7 |
| 8,805,349 B2* | 8/2014 | Frye | ........................ | H04W 4/04 455/418 |
| 8,885,498 B2* | 11/2014 | Choi | ..................... | H04W 4/006 370/252 |
| 8,930,452 B2* | 1/2015 | Baalu | ..................... | G06Q 30/02 709/204 |
| 9,047,649 B2* | 6/2015 | Haag | ........................ | H04L 67/18 |
| 9,084,118 B2* | 7/2015 | Oesterling | .......... | H04L 63/0853 |
| 9,085,303 B2* | 7/2015 | Wolverton | ............. | B60K 35/00 |
| 9,162,574 B2* | 10/2015 | Kolodziej | ............. | H04W 4/046 |
| 9,208,478 B2* | 12/2015 | Yamada | ................ | H04W 4/046 |
| 9,230,438 B2* | 1/2016 | Barrett | .................... | G08G 1/123 |
| 9,286,266 B1* | 3/2016 | Fleck | ..................... | G01C 21/20 |
| 9,332,126 B2* | 5/2016 | Tadayon | ............... | H04W 48/02 |
| 9,367,968 B2* | 6/2016 | Giraud | ............. | H04M 1/72577 |
| 9,386,447 B2* | 7/2016 | Tibbitts | ................. | H04W 8/245 |

(Continued)

*Primary Examiner* — Patrice Winder
(74) *Attorney, Agent, or Firm* — Muncy, Geissler, Olds & Lowe, P.C.

(57) ABSTRACT

A system includes an in-vehicle system containing vehicle data, a mobile device, and an interface configured to connect the mobile device to the in-vehicle system. The mobile device is configured to access the vehicle data through the interface and post the vehicle data to a user network. The mobile device is able to be mounted within the vehicle by a docking mechanism.

19 Claims, 8 Drawing Sheets

(56) References Cited

U.S. PATENT DOCUMENTS

| | | | |
|---|---|---|---|
| 2001/0033225 A1* | 10/2001 | Razavi | G01C 21/26 340/425.5 |
| 2008/0288338 A1* | 11/2008 | Wiseman et al. | 705/14 |
| 2010/0151917 A1* | 6/2010 | Wilson | H04M 1/6075 455/571 |
| 2010/0306309 A1* | 12/2010 | Santori | G06F 9/54 709/203 |
| 2011/0080274 A1* | 4/2011 | Reed | B60K 28/066 340/425.5 |
| 2011/0092159 A1* | 4/2011 | Park | H04L 63/102 455/41.2 |
| 2011/0185390 A1* | 7/2011 | Faenger | H04M 1/6075 725/75 |
| 2011/0206191 A1* | 8/2011 | Tengler | H04L 12/5865 379/88.17 |
| 2011/0214162 A1* | 9/2011 | Brakensiek | G06F 21/6218 726/4 |
| 2011/0291863 A1* | 12/2011 | Ozaki | G01C 21/3682 340/995.14 |
| 2012/0001843 A1 | 1/2012 | Gravino | |
| 2012/0065815 A1* | 3/2012 | Hess | B60K 37/00 701/2 |
| 2012/0101855 A1* | 4/2012 | Collins | G06Q 40/08 705/4 |
| 2012/0149345 A1* | 6/2012 | Jotanovic | H04W 4/003 455/414.1 |
| 2012/0158845 A1* | 6/2012 | Baalu | G06Q 30/02 709/204 |
| 2012/0176232 A1* | 7/2012 | Bantz | G07C 5/008 340/439 |
| 2012/0242510 A1* | 9/2012 | Choi | G01C 21/3688 340/988 |
| 2012/0253552 A1* | 10/2012 | Skelton | H04W 4/008 701/2 |
| 2013/0018705 A1* | 1/2013 | Heath | G08G 1/017 701/117 |
| 2013/0030645 A1* | 1/2013 | Divine | B60K 35/00 701/36 |
| 2013/0046510 A1* | 2/2013 | Bowne | G06Q 10/0833 702/187 |
| 2013/0066518 A1* | 3/2013 | Chen | G08C 17/02 701/36 |
| 2013/0106750 A1* | 5/2013 | Kurosawa | G06F 3/041 345/173 |
| 2013/0165165 A1* | 6/2013 | Macek | H04W 48/04 455/466 |
| 2013/0238440 A1* | 9/2013 | Chatterjee | G06Q 30/02 705/14.62 |
| 2013/0246135 A1* | 9/2013 | Wang | G06F 17/00 701/2 |
| 2013/0295908 A1* | 11/2013 | Zeinstra | H04W 4/046 455/418 |
| 2013/0295913 A1* | 11/2013 | Matthews, III | H04W 4/046 455/420 |
| 2013/0303143 A1* | 11/2013 | Schrader | H04W 12/08 455/418 |
| 2013/0305354 A1* | 11/2013 | King | G06F 21/31 726/19 |
| 2013/0337763 A1* | 12/2013 | Shyamalan | H04M 1/6091 455/404.1 |
| 2014/0031061 A1* | 1/2014 | Thibault | H04W 4/027 455/456.1 |
| 2014/0045427 A1* | 2/2014 | Mohn | G08G 1/00 455/41.2 |
| 2014/0066053 A1* | 3/2014 | Burke | H04W 4/00 455/426.1 |
| 2014/0155052 A1* | 6/2014 | Glover | H04W 4/046 455/419 |
| 2014/0164559 A1* | 6/2014 | Demeniuk | H04B 1/082 709/217 |
| 2014/0187219 A1* | 7/2014 | Yang | H04W 4/046 455/418 |
| 2014/0189801 A1* | 7/2014 | Rokusek | G06F 21/00 726/4 |
| 2014/0191886 A1* | 7/2014 | Barrett | G08G 1/0112 340/989 |
| 2014/0200739 A1* | 7/2014 | Kirsch | H04L 67/12 701/1 |

* cited by examiner

METHOD TO TRANSMIT REAL-TIME IN-VEHICLE INFORMATION TO AN INTERNET SERVICE

BACKGROUND OF THE INVENTION

Field of the Invention

The present invention relates to social networking and, more particularly, to a method and system for transmitting real-time data from a vehicle system to an internet-based social network using a mobile device.

Description of the Background Art

As social networking and constant connectivity to their digital lives becomes more important, people are spending more time using their mobile connectivity devices in the vehicle. Currently, an increasing number of people use their mobile devices (e.g., smart-phones) to access social networks (e.g., Facebook, twitter, etc.) while driving. The use of electronic devices, especially smart-phones, while driving can be highly distracting and potentially dangerous. Because of this, distracted driving receives much attention from the media, the automotive industry, and the regulating bodies. New, stricter federal regulations are planned to prevent people from using mobile devices while driving. Indeed, thirty-five states have banned texting while driving. Despite these laws, however, people continue to use their devices in the car in a distracting manner while driving.

While addressing the aforementioned concerns, the automotive industry also has the need to meet customer expectations in connecting its cars to social media. Through a gateway, a user has the ability to access vehicle controller area network (CAN) data (e.g., accurate speed, fuel/energy consumption, distance travelled, time travelled, etc.) and share this information with the user's social network through a mobile device.

There are different conventional methods for integrating a social network or third party application, in general, into the vehicle's infotainment (e.g., radio and navigation) system. There are several conventional methods to connect the infotainment system to a social network. One such method includes integration by duplicating the contents of a smart-phone screen to an infotainment display (e.g., MirrorLink). This method uses virtual network computing (VNC) for screen control and access. VNC basically works by copying the device screen, pixel-per-pixel, and sending it to the infotainment system several times per second. Another method includes using a third party application programming interface (API) in the infotainment system program code to access third party application code running on a backend server. Additionally, one conventional method includes accessing smart-phone application program code, but controlling and operating the application by using the built-in infotainment display (i.e., remote control smartphone application).

Another conventional method, as disclosed in U.S. Patent Application Publication No. 2012/0001843, includes changing a user interface of a mobile computing device when the device is in a motion state. While driving, the user interface can change to display only certain functions, which reduces driver distraction. Furthermore, the method automatically posts user-location information to a social network. Additionally, information can include the user's longitude and latitude, speed, origin, time traveled, route, etc.

Furthermore, another conventional method is disclosed in U.S. Patent Application Publication No. 2012/0158845. In this method, the user inputs predefined auto update data (filter, setup). The system/method then automatically posts that information either periodically or in predefined driving situations (e.g., start/arrival, 10 miles before point of interest, etc.). A drawback to this method is that it is inconvenient to require the user to always post information before arriving to a destination. Instead, the user may wish to post in some situations and not in others. Since the option is predefined in the setup, the user cannot spontaneously post desired information.

There is no conventional method, however, to directly connect vehicle data to a user's social network via a mobile device.

SUMMARY OF THE INVENTION

In view of the foregoing and other exemplary problems, drawbacks, and disadvantages of the conventional methods and structures, an exemplary feature of the method and system of the present invention is to improve the possibility of safely posting information to social networks with a mobile device (e.g., smart-phone) while the mobile device is connected to a vehicle. Another aspect of the invention is to offer a safe way of performing user-triggerable posting with a mobile device connected to a vehicle while driving.

In accordance with a first exemplary, non-limiting aspect of the present invention, a system includes an in-vehicle system containing vehicle data, a mobile device, and an interface configured to connect the mobile device to the in-vehicle system. The mobile device is configured to access the vehicle data through the interface and post the vehicle data to a user network. The vehicle data may include, but is not limited to, trip (current and or previous/saved) information (including duration, fuel/energy consumption, distance traveled, destination, etc.), current vehicle location, infotainment features, streaming audio, in-vehicle photos, vehicle diagnostic information, vehicle navigation system information, etc.

In accordance with a second exemplary, non-limiting aspect of the present invention, a system includes a mobile device, a dock configured to mount the mobile device within a vehicle, an in-vehicle system containing vehicle data, and an interface configured to connect the mobile device to the in-vehicle system. The mobile device is configured to access the vehicle data through the interface and post the vehicle data to a user network.

In accordance with a third exemplary, non-limiting aspect of the present invention, a method includes connecting a mobile device to an in-vehicle system, accessing the vehicle data using the mobile device, and providing the vehicle data to a user network.

When a user enters a vehicle, the user connects the mobile device to the vehicle. This can be done by mechanically and/or electrically (including wireless) connecting the device to the vehicle using a docking station/mechanism. By attaching the mobile device using the cradle, the driver also puts the mobile device in a prominent, easy to reach place in the car. Upon connection, the mobile device reduces its user interface to predefined posting options including predefined car data (e.g., speed, temperature, wipers, lights, AC on, etc.), predefined position or route related data, music data, car interior photo, etc. The mobile device can optionally start a program or "app" upon connection to the car.

By docking the mobile device in the vehicle (or connecting it to the car wirelessly), the mobile device switches to a posting-ready mode enabling the user with only a few touch gestures (or clicks) to post information at the chosen moment (e.g., user triggered). By providing the posting-ready mode to the driver, the driver is not able to type in lengthy text or to search menus, applications or information in the mobile device. In fact, the driver is not able to see how the posted information looks in the car, thus reducing driver distraction. With a swiping gesture the user can switch from one predefined set of information to another. Tapping on the screen can either post the information immediately or provide an additional verifying question whether the user (e.g., driver) really wants to send out the information. The mobile device can be enabled to offer different posting information depending on the connected car (e.g., owner's car, rented car, friend's car, etc.) or even car type (e.g., gasoline, electric, diesel, manufacturer, etc.)

By using a mobile device and a software application that is connected to the vehicle, the user can take advantage of the phone's hardware and software functionality (e.g., cameras, sensors, GPS, music library, social network logins, and established preferences, etc.). For example, the user is able to take a picture while driving using a built-in camera in the mobile device (with an optimized graphical user interface that is designed not to be distracting).

Furthermore, the advantage of using the mobile device's hardware and software functionality in an in-vehicle environment provides the opportunity to combine this functionality with CAN data from the car. For example, this may include an augmented reality feature for lane keeping. Also, data that is not available in the car (e.g., traffic data or weather information that could be provided by the smartphone) can be combined with real-time vehicle data to improve convenience or safety while driving.

The user is already familiar with the hardware and software functionality of the user's mobile device and would expect the functionality to be supported while driving as well. With the present system/method, the user is able to use the functionality in substantially the same way, except that it is driver-optimized.

Moreover, the user can use the vehicle application content in a driver-optimized way (i.e., docked mode) and also use the application on the phone when not driving (i.e., undocked mode). The undocked mode is optimized for a regular (i.e., non-driving) usage (e.g., review of achievements, trips, posted photos, etc.).

Additionally, the mobile device is integrated to the infotainment system including the in-vehicle antenna, speakers, and microphones. The mobile device application can take advantage of this infrastructure and enhance the overall user experience (e.g., playing back the audio Internet radio audio source, controlling the volume or sound settings with the radio's user interface or using the in-vehicle microphones for a more reliable voice controlled function). Without navigating a complicated menu structure, the user is able to quickly post and confirm a post to the user's social network (e.g., "two-touch posting").

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, do not limit the present invention, and wherein.

DETAILED DESCRIPTION

Figure 1:
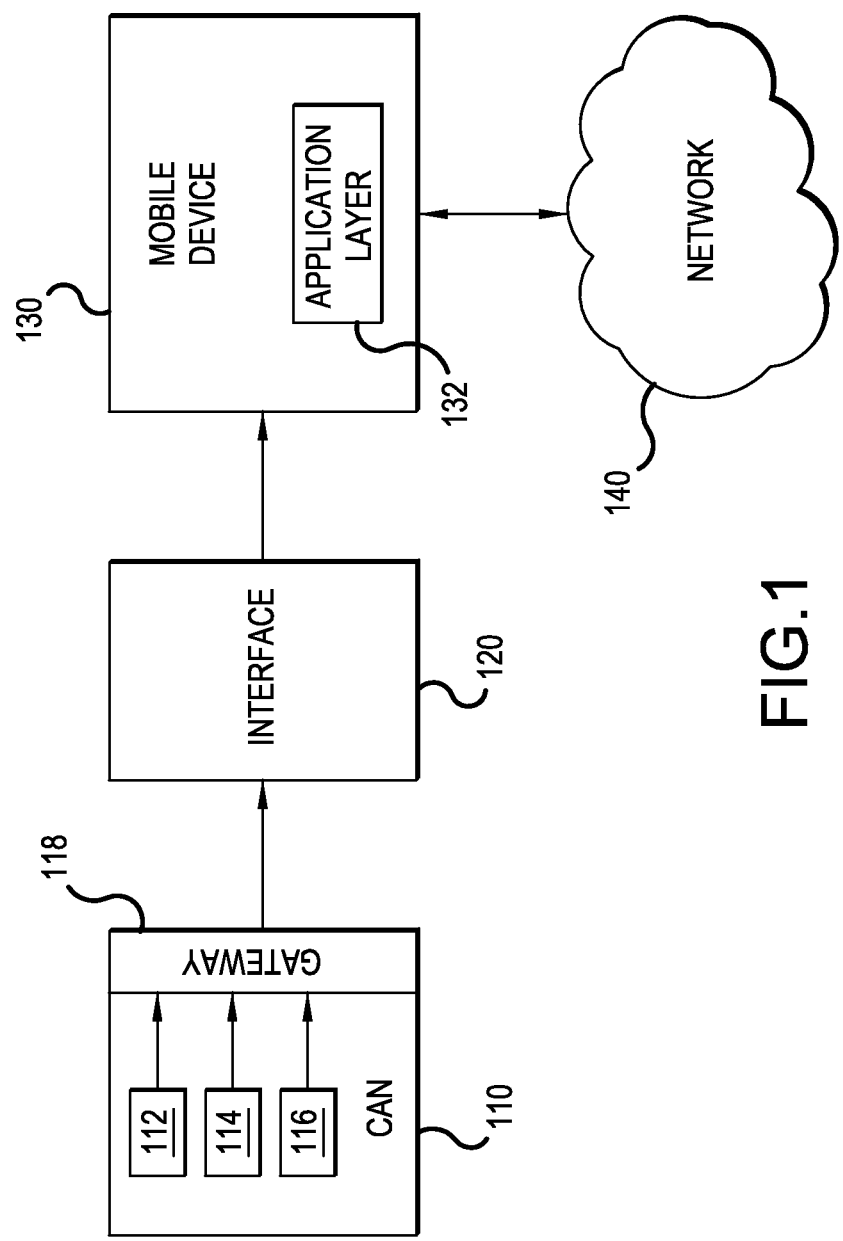
FIG. 1 illustrates a system 100 according to certain exemplary embodiments of the present invention.

Referring now to the drawings, and more particularly to FIGS. 1-8, there are shown exemplary embodiments of the method and structures according to the present invention.

FIG. 1 illustrates a system according to certain exemplary embodiments of the present invention. The system 100 includes an in-vehicle system/database (e.g., in-vehicle controller area network (CAN)) 110, an interface 120, and a mobile device 130 (e.g., mobile smart-phone). The CAN 110 is a vehicle bus standard designed to allow microcontrollers and devices to communicate with each other within a vehicle without a host computer. The CAN 110 includes a plurality of CAN buses including KCAN data 112, ACAN data 114, and DCAN data 116. The CAN buses may have different data transmission speeds. The CAN 110 also includes a gateway 118 configured to allow a user to access data contained in the CAN 110. The gateway 118 is configured to route CAN data between the different physically divided CAN buses. In the embodiment illustrated in FIG. 1, only data from the KCAN bus 112 is routed by the gateway 118. However, the gateway 118 may route data from any of the CAN buses (e.g., DCAN and/or ACAN). The interface 120 is configured to connect the mobile device 130 to the vehicle's CAN 110. The interface 120 may include, for example, a medium dependent interface (MDI). The user, through using the mobile device 130, may connect CAN data accessed from the vehicle CAN 110 to a network 140 outside of the vehicle (e.g., internet-based network, the user's social network, etc.) through an internet connection (e.g., wireless connection). The mobile device 130 includes one or more applications 132. The user is able to interact with the vehicle system using the functionality of the mobile device applications. Indeed, the system is configured such that the user is able to interact with the vehicle system using just the mobile device and its applications, without having to utilize any other devices or controls.

Figure 2:
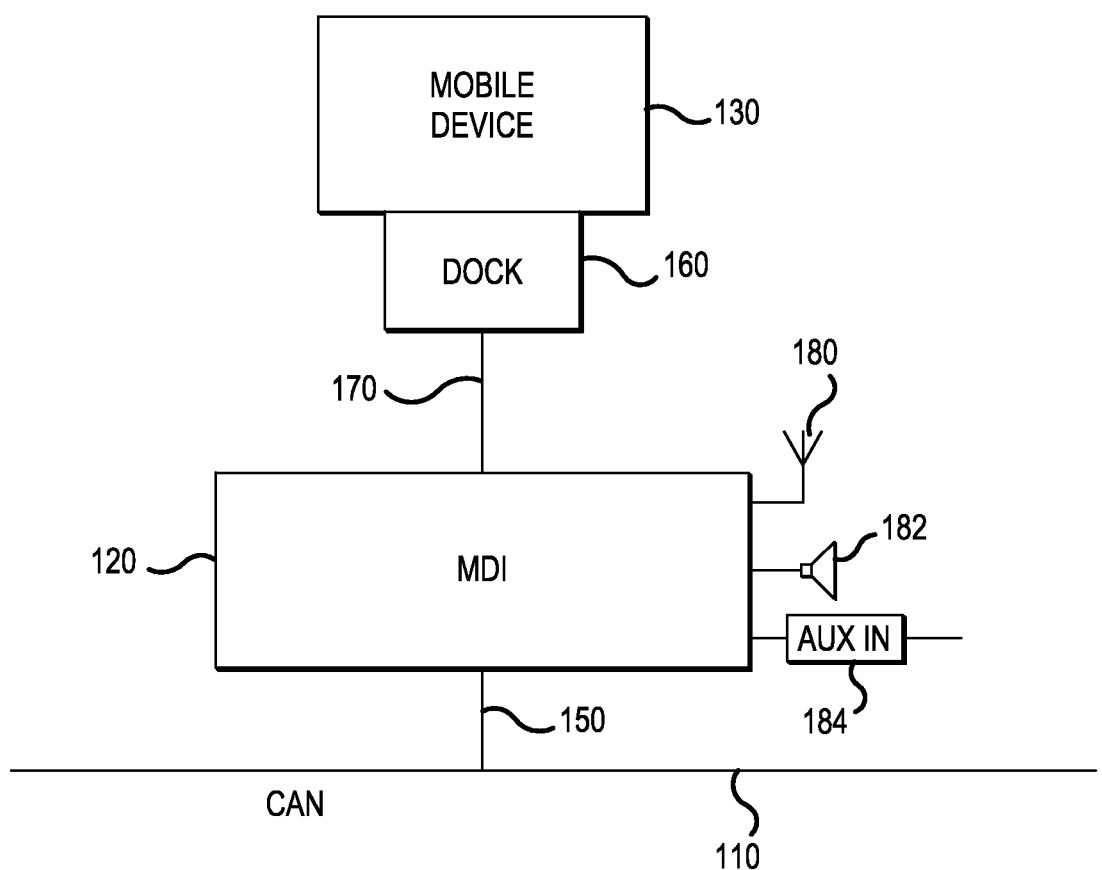
FIG. 2 illustrates components of the system 100 illustrated in FIG. 1.

FIG. 2 further details the specific components of the system 100 illustrated in FIG. 1. The CAN 110 is connected to the interface 120 using a system bus 150. The mobile device 130 is connected to the interface 120 through a docking station/mechanism (e.g., docking cradle) 160. The connection 170 between the interface 120 and the docking mechanism 160 is configured to transfer, for example, data (e.g., vehicle CAN data), power, audio signals, etc. The interface 120 is also configured to be connected to an in-vehicle antenna 180, in-vehicle speakers 182, and/or an auxiliary input 184. Accordingly, the mobile device 130 is integrated to the vehicle infotainment system including the in-vehicle antenna, speakers, etc. The mobile device applications can take advantage of this infrastructure and enhance the overall user experience (e.g., playing back the audio internet radio audio source, controlling the volume or sound settings with the radio's user interface or using the in-vehicle microphones for a more reliable voice controlled function).

Upon connection of the mobile device 130 to the interface 120, the mobile device 130 limits its operations to a reduced number of in-vehicle functions. Specifically, the mobile device 130 is configured to reduce its user interface to predefined in-vehicle posting options including predefined car data (e.g., speed, temperature, wipers, lights, AC on, etc.), predefined position or route related data, music/audio data, vehicle interior photo, vehicle trip data, etc. Furthermore, a specific in-vehicle related application may automatically initiate upon connecting the mobile device to the vehicle.

By docking the mobile device in the vehicle (or connecting it to the car wirelessly), the mobile device 130 is configured to switch to a posting-ready mode enabling the user to post information at the chosen moment using only a few touch gestures. By providing the posting-ready mode to the driver, the driver is not able to type in lengthy text or to search menus, applications or information in the mobile device. In fact, the driver is not able to see how the posted information looks in the car, thus reducing driver distraction. That is, the number of potentially distracting mobile device functions is limited (or eliminated). With a swiping gesture the user can switch from one predefined set of information to another.

Additionally, as is illustrated in FIG. 2, the mobile device is integrated to the infotainment system including the in-vehicle antenna 180, speakers 182, and microphones 184 (e.g., auxiliary input). The mobile device application 132 can take advantage of this infrastructure and enhance the overall user experience (e.g., playing back the audio internet radio audio source, controlling the volume or sound settings with the radio's user interface or using the in-vehicle microphones for a more reliable voice controlled function).

Figure 3:
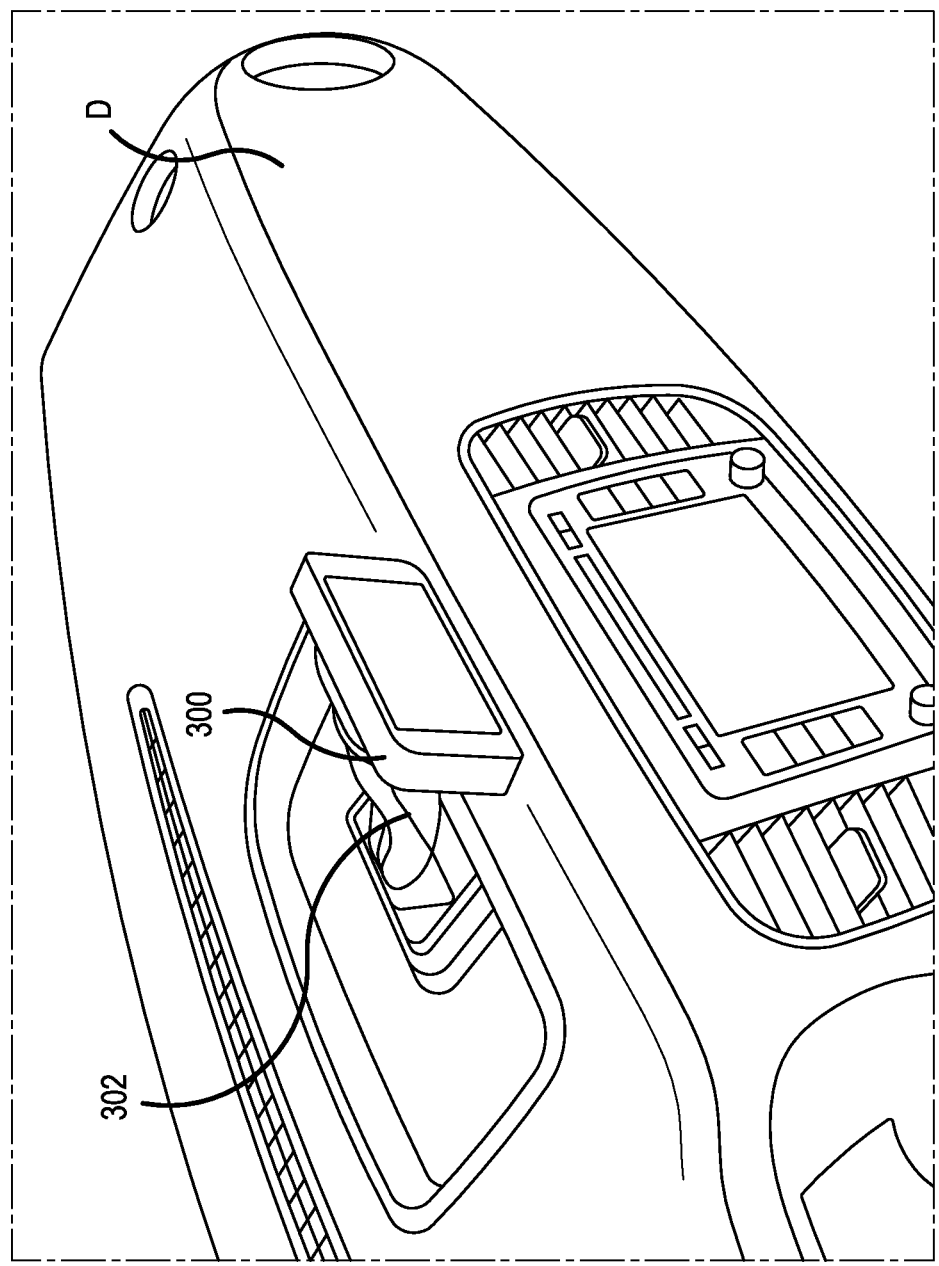
FIG. 3 illustrates an example of a mobile device 300 mounted within a vehicle dashboard D.

FIG. 3 illustrates an example of a mobile device 300 mounted within a vehicle dashboard D. In the embodiment illustrated in FIG. 3, the mobile device 300 is a mobile smart-phone. The mobile device, however, may include any other mobile device including, but not limited to, mobile phones, tablet devices, etc. The mobile device 300 may be mounted anywhere in the vehicle, but is preferably mounted in a position within a user's (e.g., driver's) line of sight. In the embodiment illustrated in FIG. 3, the mobile device 300 is mounted to the dashboard D using a docking cradle 302. While docked in the cradle 302, the user can view and post current information from the vehicle to a social network. By mounting the mobile device 300 using the cradle 302, the user puts the mobile device in a prominent, easy to reach location in the vehicle.

Figure 4:
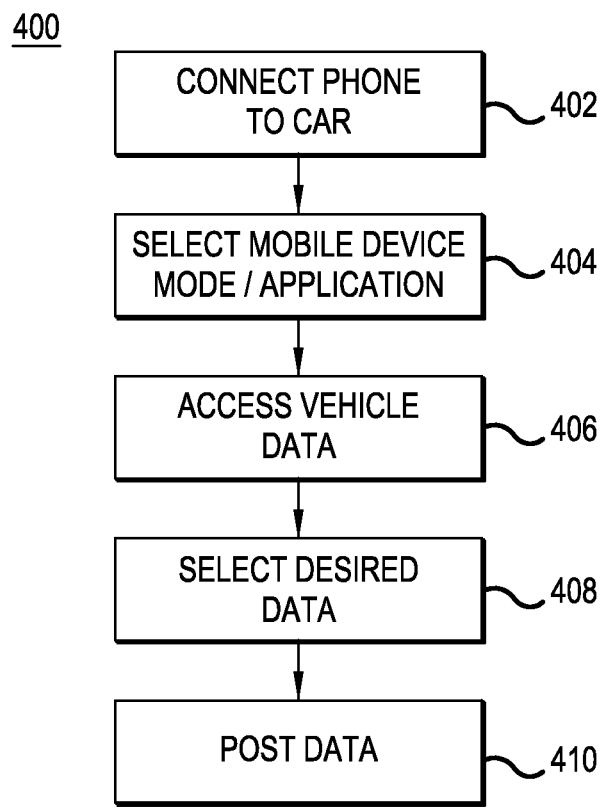
FIG. 4 illustrates a method 400 according to certain exemplary embodiments of the present invention.

FIG. 4 illustrates a method 400 for accessing and transferring data from the vehicle CAN to a user's social network. The user first connects the mobile device to the vehicle CAN network through the interface (402). This can be done either through a direct wired connection or wirelessly. Once the mobile device is connected to the vehicle CAN network, the user, using the hardware and software functionality already provided on the mobile device, selects a mobile device mode/application (404). Through the interface, the mobile device then accesses the CAN data contained in the vehicle CAN (406). Using the mobile device, the user is then able to select desired data to save and/or post on the user's social network (408). Once the user selects the desired data, the user is able to control the system to post the data to the user's social network (410).

By using a mobile device and a software application that is connected to the vehicle, the user can take advantage of the phone's hardware and software functionality (e.g., cameras, sensors, GPS, music library, social network logins, and established preferences, etc.). For example, the user is able to take a picture while driving using a built-in camera in the mobile device (with an optimized graphical user interface that is designed not to be distracting). FIGS. 5-8 illustrate some exemplary uses for the mobile device while connected to the vehicle system utilizing the system and method described above.

FIG. 5 illustrates a method for browsing previous, automatically saved trips that consist of three categories of information: trip information, trip distance, and cumulative average fuel/energy consumption. Vehicle CAN information is displayed on the smart phone touch screen in a way such that the user can compare current information to previous information in real-time. The user can lock (i.e., select value as a constant reference value) either duration or distance to have a reference to previous data at a moment in time or distance.

Figure 5A:
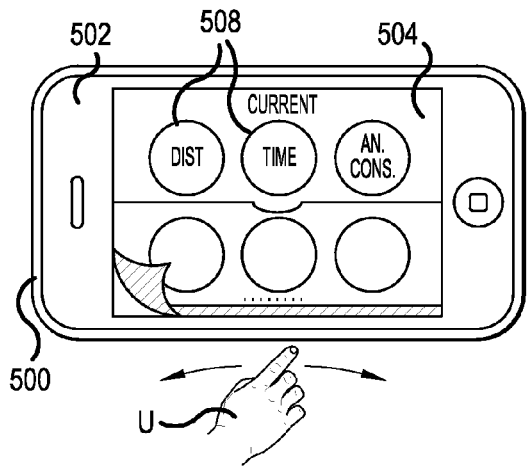
FIGS. 5A to 5F illustrate a method for browsing vehicle trip information.
Figure 5B:
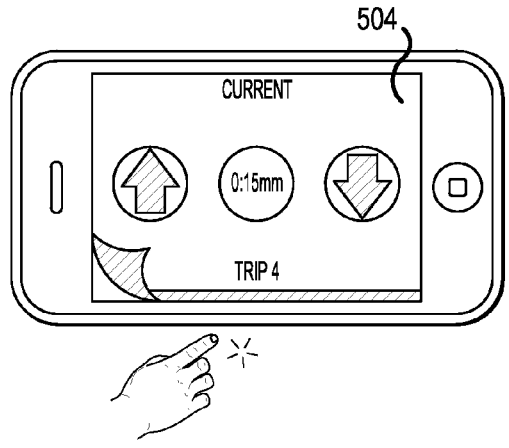
Figure 5C:
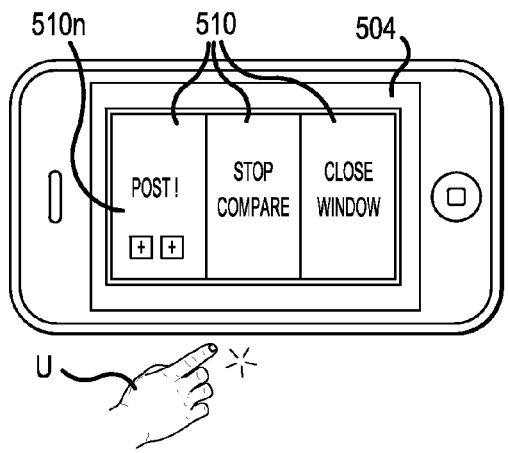
Figure 5D:
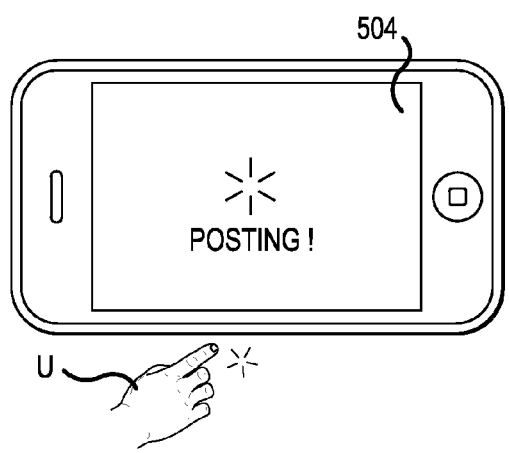
Figure 5E:
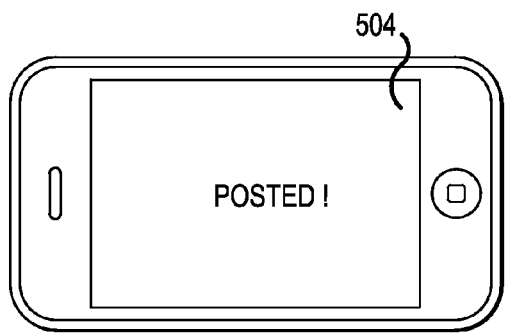
Figure 5F:
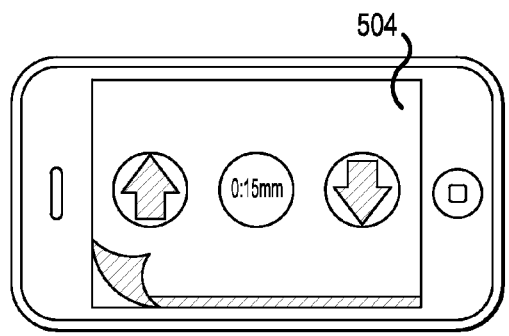
Figure 6A:
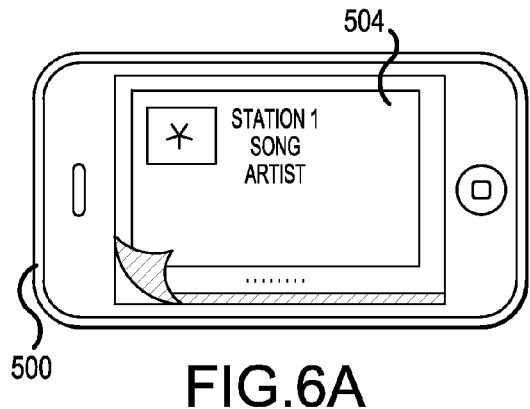
FIGS. 6A to 6F illustrate a method for navigating and posting streaming audio information.
Figure 6B:
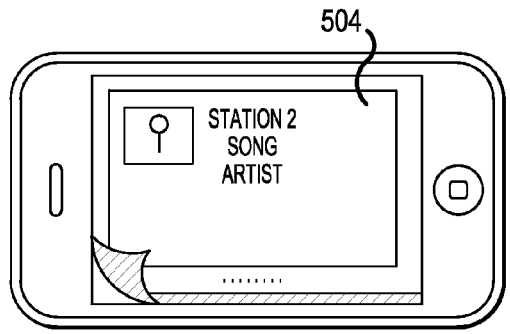
Figure 6C:
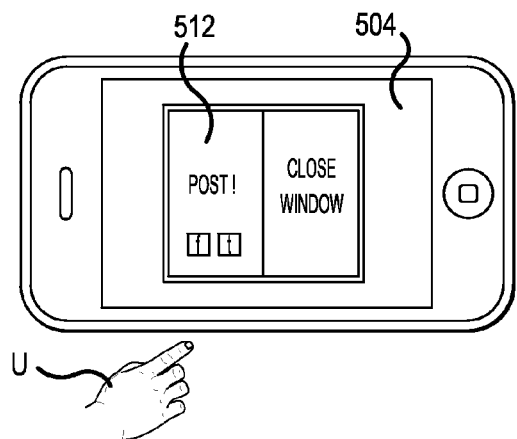
Figure 6D:
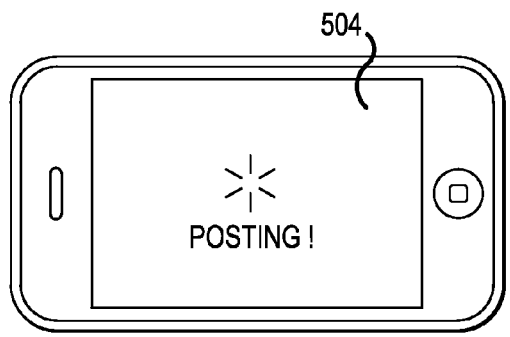
Figure 6E:
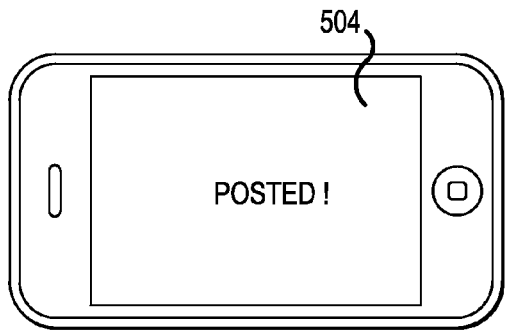
Figure 6F:
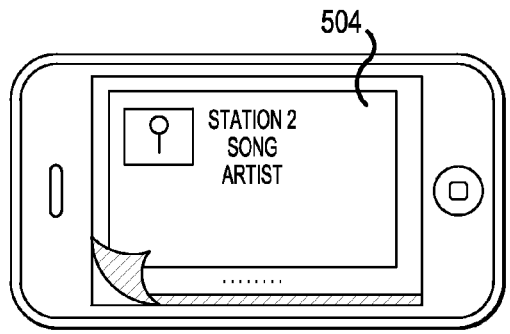
Figure 7A:
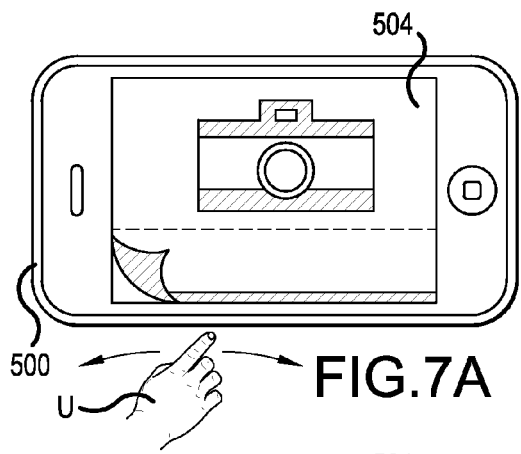
FIGS. 7A to 7H illustrate a method for taking and sharing a picture while the mobile device 500 is docked.
Figure 7B:
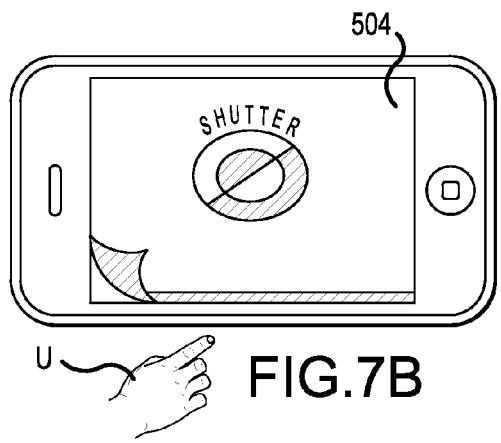
Figure 7C:
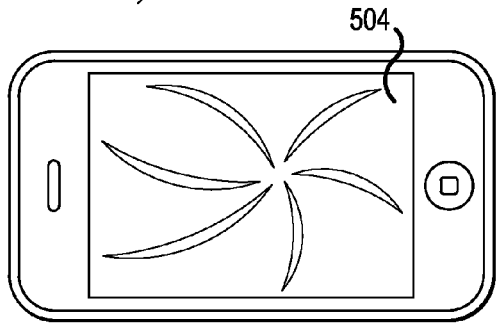
Figure 7D:
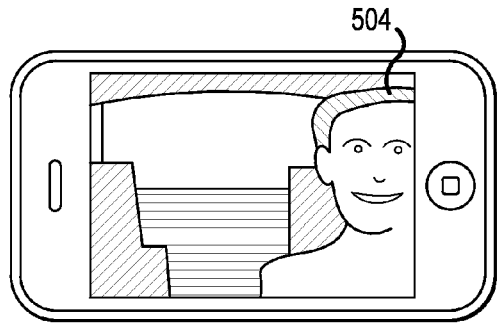
Figure 7E:
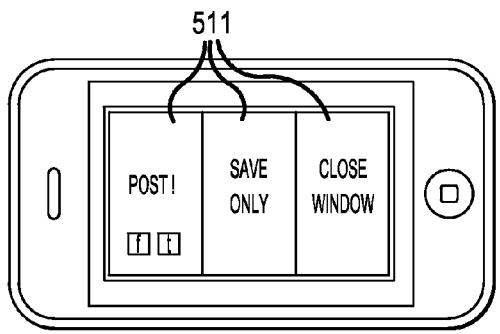
Figure 7F:
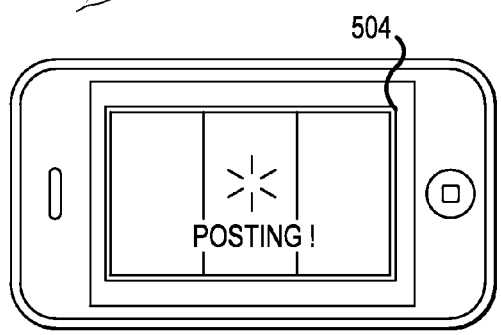
Figure 7G:
Figure 7H:
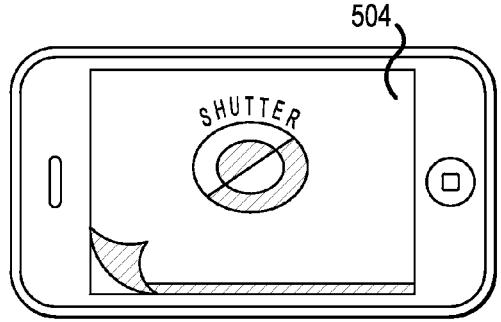
Figure 8A:
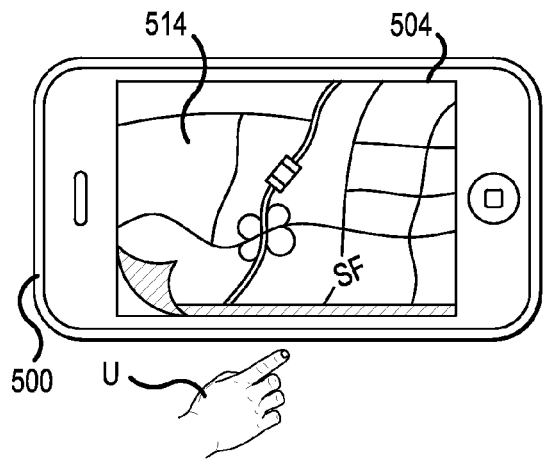
FIGS. 8A to 8D illustrate a method for posting a current position of the vehicle.
Figure 8B:
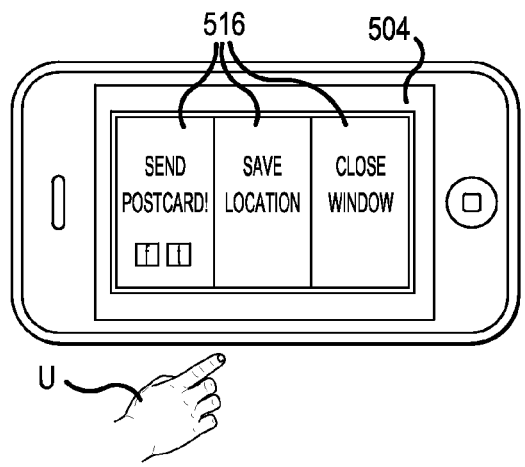
Figure 8C:
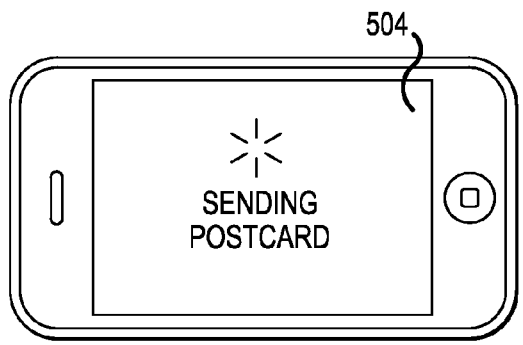
Figure 8D:
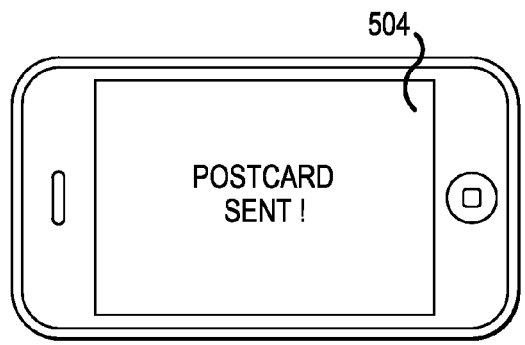

FIG. 5a illustrates the front surface/face 502 of a mobile device 500. The interactive touch screen 504 of the mobile device 500 displays saved CAN data 508 regarding previous trips, such as trip distance, time duration, etc. The user U is able to scroll through saved trips by inputting a swiping gesture (e.g., left and/or right swiping). As is illustrated in FIG. 5b, the user U can tap the touch screen 504 to lock the screen 504 on a desired trip. Then, as is illustrated in FIG. 5c, the user U taps the touch screen again to bring up one or more selectable options 510. In the example illustrated in FIG. 5c, the options include an option for posting the data, stopping the trip comparison, and closing the options window. As is illustrated in FIG. 5d, to post the CAN data to a user's social network, the user simply taps the post option 510a. Next, the touch screen 504 presents an indication (e.g., visual confirmation) that the data has been posted (see FIG. 5e). The touch screen 504 then returns (e.g., automatically) back to the selected trip (see FIG. 5f).

FIG. 6 illustrates a method for navigating and posting streaming audio information. In FIG. 6a, the touch screen 504 is configured to display a radio station and information (e.g., artist name, song name, etc.) regarding the song currently playing on the vehicle infotainment system. The user U may, through a similar swiping motion to that used in FIG. 5, scroll through different radio stations (FIG. 6b). Once the user U finds a desired radio station, the user U taps the touch screen 504 to bring up an option screen (FIG. 6c) including, at least, a post option 512. To post the streaming audio information, the user U merely taps the post option (FIG. 6d). Next, the touch screen 504 presents an indication (e.g., visual confirmation) that the data has been posted (see FIG. 6e). The touch screen 504 then returns (e.g., automatically) back to the radio station screen (see FIG. 6f).

FIG. 7 illustrates a method for taking and sharing a picture while the mobile device 500 is docked. The user U may input swiping motion, similar to that described above, to scroll through saved pictures. The user U may then tap the touch screen 504 to select a picture or to select an option to take a new picture, as in FIG. 7a. Once the user U selects the option to take a new picture, the touch screen 504 displays a shutter control (FIG. 7b). The user U taps the shutter control on the touch screen 504 to take a picture. Then, as is illustrated in FIG. 7c, the shutter closes, taking a picture. Next, the touch screen 504 displays a preview of the picture (FIG. 7d). When the user U taps the picture, the touch screen displays one or more picture options 511 (FIG. 7e). In the embodiment illustrated in FIG. 7e, the options include an option for posting the picture, for saving the picture, and an option for closing the option window. To post the picture, the user U taps the post picture option. Next, the touch screen 504 presents an indication that the picture is being posted (FIG. 7f) and then an indication (e.g., visual confirmation) that the picture has been posted (FIG. 7g). Once the picture is sent, the touch screen 504 returns back to the shutter control screen (FIG. 7h).

FIG. 8 illustrates a method for posting a current position of the vehicle. The system obtains a map of the current location of the vehicle from the navigation system. The touch screen 504 displays the map indicating the current position of the vehicle (FIG. 8a). The user U taps on the map 514 to display one or more options 516 on the touch screen 504 (FIG. 8b). In the example illustrated in FIG. 8b the options include sending a postcard (i.e., sending/posting the current position), saving the location, and closing the options window. To send the postcard, the user U taps the send postcard option. Next, the touch screen 504 presents an indication that the postcard is being sent (FIG. 8c) and then an indication (e.g., visual confirmation) that the postcard has been sent (FIG. 8d).

The prevention of driver distraction is an important consideration for a safe integration of mobile device functionality into the vehicle and the in-vehicle infotainment system. Therefore, the simplification and reduction of user interaction and interaction steps, as illustrated in FIGS. 5-8, with the mobile device application is important in order to prevent driver distraction. In this case a "Two-Touch HMI" (i.e., two touch human machine interface) concept using simple touch gestures is implemented. That is, the user needs to only perform two HMI steps (interacting with the user interface of the mobile application) in order to share information (e.g., positing to a specific social network) while driving. The user is able to share car events by simply touching the screen of the mobile device and posting information without the need for additional interactional steps. Without navigating a complicated menu structure, the user is able to quickly post and confirm a post to the user's social network (e.g., "two-touch posting").

The method of the invention may be implemented in a typical computer hardware configuration, which may be incorporated into the vehicle. That is, the method may be implemented in a dedicated processor or in the main computer system of the vehicle. Additionally, a different aspect of the invention includes a computer-implemented method for performing at least certain steps in the above method. Such a method may be implemented, for example, by operating a computer, as embodied by a digital data processing apparatus, to execute a sequence of machine-readable instructions. These instructions may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

With this architecture, and by implementing a driver-distraction-limited optimized method to operate a mobile application on a docked mobile device via gesture control, the industry can provide the user the ability to more safely connect the user's car to a network while driving.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system, comprising:
an in-vehicle system containing vehicle data;
a mobile device including a user interface; and
an interface configured to connect the mobile device to the in-vehicle system,
wherein the mobile device is configured to access the vehicle data through the interface and post the vehicle data to a user network,
wherein the user is able to interact with the in-vehicle system through the user interface of the mobile device,
wherein upon connection of the mobile device to the in-vehicle system, the mobile device automatically enters a posting-ready mode in which the user is able to access applications on the mobile device through the user interface, and
wherein in the posting-ready mode, the mobile device reduces the user interface to predefined posting options by limiting access to only certain predefined functions on the mobile device and in the posting-ready mode, the predefined posting options allow the user to actively post the vehicle data to the user network.

2. The system according to claim 1, wherein the user network comprises an internet-based social network.

3. The system according to claim 1, wherein the mobile device is configured to post the vehicle data to the user network utilizing only functionality of the mobile device.

4. The system according to claim 1, wherein the mobile device is configured to connect the mobile device to the in-vehicle system.

5. The system according to claim 1, wherein the user interface of the mobile device comprises a touch screen, and wherein the mobile device is configured to access the vehicle data by receiving user touch input on the touch screen.

6. The system according to claim 5, wherein the mobile device is configured to access the vehicle data using only touch input on the touch screen.

7. The system according to claim 1, wherein, when connected to the in-vehicle system, the mobile device is configured to operate a limited set of functions.

8. The system according to claim 1, wherein the vehicle data comprises current vehicle trip information or information related to saved, previous vehicle trips.

9. The system according to claim 1, wherein the mobile device is configured to post streaming audio from a vehicle infotainment system to the user network.

10. The system according to claim 1, wherein the vehicle data comprises a current location of the vehicle.

11. The system according to claim 1, wherein when the mobile device is connected to the in-vehicle system, the mobile device is configured to automatically initiate an in-vehicle related application on the mobile device.

12. The system according to claim 1, wherein in the posting-ready mode, the user interface is modified such that user is able to post information using a reduced number of touch gestures.

13. The system according to claim 1, wherein the predefined posting options include predefined vehicle data, predefined position or route data, music data or car interior photo data.

14. The system according to claim 1, wherein in said posting-ready mode a user is enabled to post the vehicle data to the user network using only tapping and swiping input operations.

15. The system according to claim 1, wherein said certain predefined functions on the mobile device consist of user network posting operations.

16. The system according to claim 1, wherein said certain predefined functions include enabling a user to browse and select the vehicle data.

17. A system, comprising:
- a mobile device including a user interface;
- a dock configured to mount the mobile device within a vehicle;
- an in-vehicle system containing vehicle data; and
- an interface configured to connect the mobile device to the in-vehicle system,
- wherein the mobile device is configured to access the vehicle data through the interface and post the vehicle data to a user network,
- wherein the user is able to interact with the in-vehicle system through the user interface of the mobile device,
- wherein upon connection of the mobile device to the in-vehicle system, the mobile device automatically enters a posting-ready mode in which the user is able to access applications on the mobile device through the user interface, and
- wherein in the posting-ready mode, the mobile device reduces the user interface to predefined posting options by limiting access to only certain predefined functions on the mobile device and in the posting-ready mode, the predefined posting options allow the user to actively post the vehicle data to the user network.

18. A method, comprising:
- connecting a mobile device to an in-vehicle system, the mobile device comprising a user interface;
- accessing vehicle data from the in-vehicle system using the mobile device; and
- providing the vehicle data to a user network,
- wherein the vehicle data is accessed and posted to the user network utilizing only functionality of the mobile device,
- wherein the user is able to interact with the in-vehicle system through the user interface of the mobile device,
- wherein upon connection of the mobile device to the in-vehicle system, the mobile device automatically enters a posting-ready mode in which the user is able to access applications on the mobile device through the user interface, and
- wherein in the posting-ready mode, the mobile device reduces the user interface to predefined posting options by limiting access to only certain predefined functions on the mobile device and in the posting-ready mode, the predefined posting options allow the user to actively post the vehicle data to the user network.

19. The method according to claim 18, wherein the user network comprises an internet-based social network.

* * * * *